United States Patent
Yamamoto et al.

[11] Patent Number: 6,099,675
[45] Date of Patent: Aug. 8, 2000

[54] RESIST REMOVING METHOD

[75] Inventors: Masayuki Yamamoto; Makoto Namikawa; Eiji Toyoda; Shigeji Kuroda; Saburo Miyamoto; Takao Matsushita, all of Ibaraki, Japan

[73] Assignee: Nitto Denko Corporation, Osaka, Japan

[21] Appl. No.: 09/203,497

[22] Filed: Dec. 1, 1998

[30] Foreign Application Priority Data

Dec. 2, 1997 [JP] Japan ................................ 9-331530

[51] Int. Cl.⁷ .................... B32B 31/16; C09J 5/06; G05G 15/00; H01J 21/30

[52] U.S. Cl. .................... 156/241; 156/247; 156/311; 156/344; 156/349; 156/584; 438/458

[58] Field of Search ................................ 156/344, 584, 156/241, 247, 349, 311; 24/230, 426.1, 426.3, 426.5; 226/94, 96; 438/458

[56] References Cited

U.S. PATENT DOCUMENTS

| | | | |
|---|---|---|---|
| 4,631,103 | 12/1986 | Ametani | 156/241 |
| 4,775,438 | 10/1988 | Funakoshi et al. | 156/241 |
| 5,009,735 | 4/1991 | Ametani et al. | 156/241 |
| 5,466,325 | 11/1995 | Mizuno et al. | 156/344 |
| 5,759,336 | 6/1998 | Yamamoto et al. | 156/379.6 |
| 5,891,298 | 4/1999 | Kuroda et al. | 156/344 |

*Primary Examiner*—Mark A. Osele
*Assistant Examiner*—J. A. Lorengo
*Attorney, Agent, or Firm*—Arent Fox Kintner; Plotkin & Kahn PLLC

[57] ABSTRACT

An adhesive tape is applied to an article covered with a resist pattern. The article with the adhesive tape applied thereto is rapidly cooled to form cracks in the resist pattern on the surface of the article to weaken the cohesion between the resist pattern and the surface of the article. After the cooling, the adhesive tape is separated from the article, whereby the resist pattern is removed with the adhesive tape from the surface of the article.

20 Claims, 4 Drawing Sheets

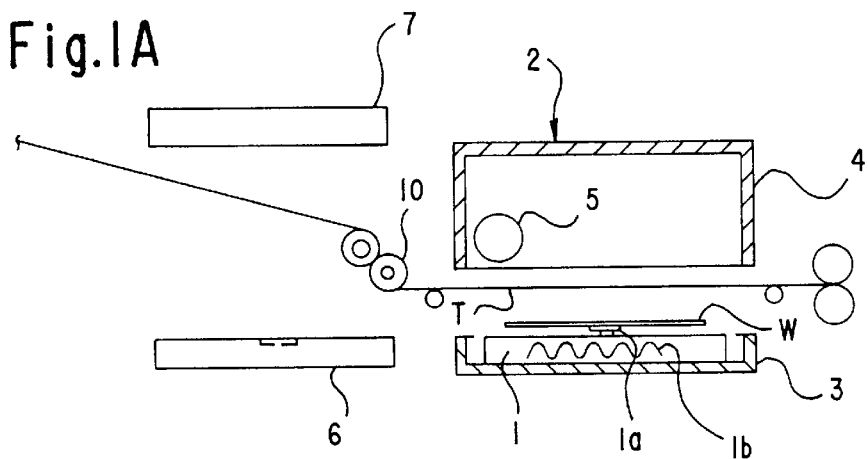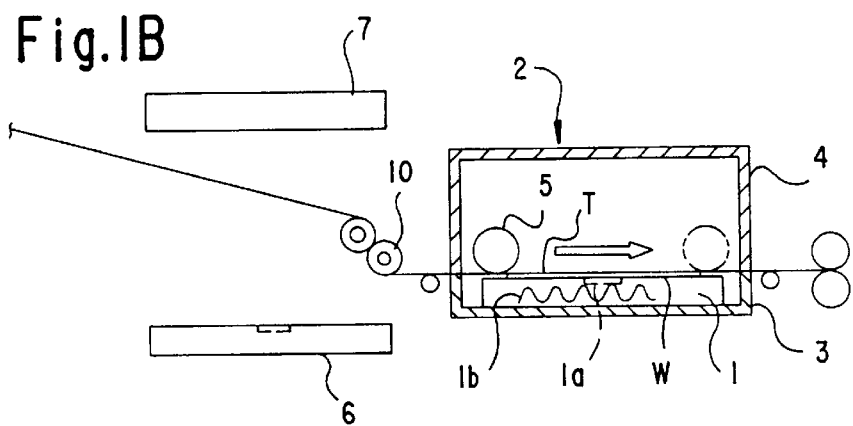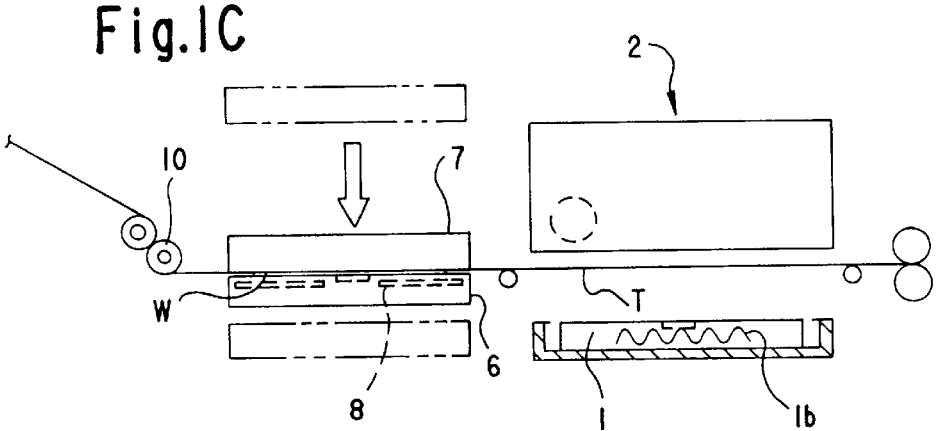

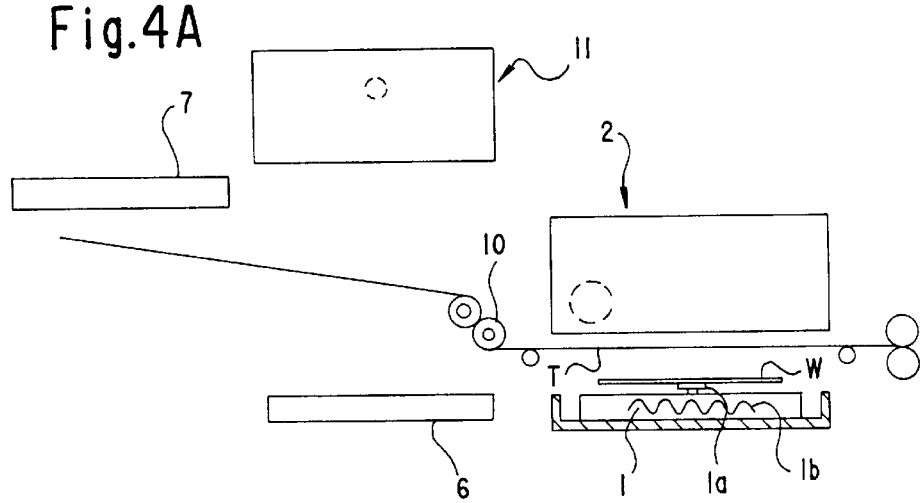
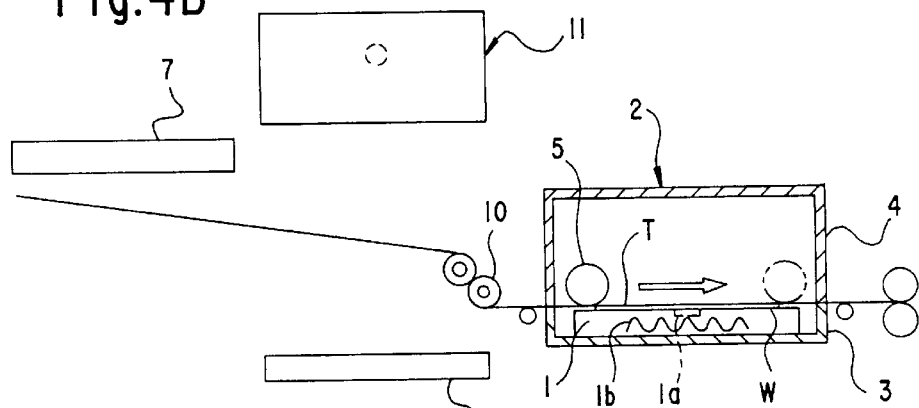
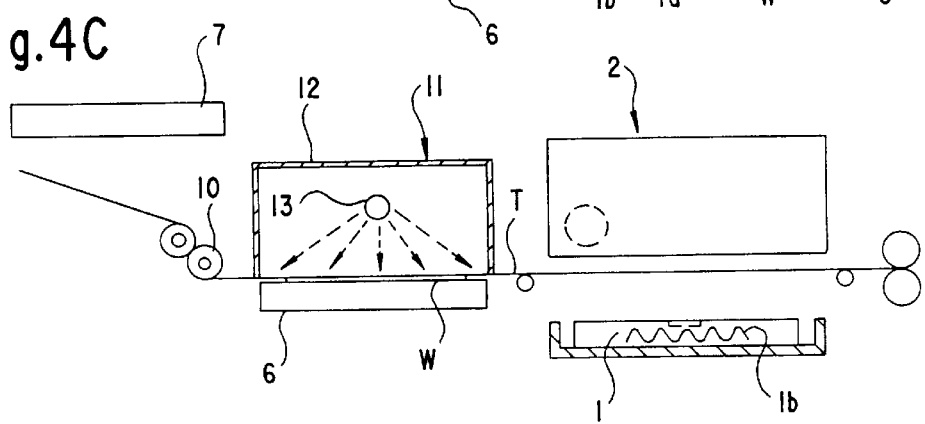

RESIST REMOVING METHOD

BACKGROUND OF THE INVENTION (1) Field of the Invention

This invention relates to methods of removing, in time of manufacture, unnecessary resist patterns from surfaces of various micro-fabricated articles such as semiconductor substrates, printed circuit boards, masks and lead frames.

(2) Description of the Related Art

When manufacturing a semiconductor device, for example, a resist solution is applied to a semiconductor substrate such as a silicon wafer. A predetermined image (resist pattern) is formed thereon through a usual photographic process. The resist pattern is used as a mask in various processes including ion injection, etching and doping. Subsequently, the resist pattern no longer needed is removed to form a predetermined circuit. Then, the resist solution is applied again to form a next circuit. This cycle is repeated. Also where circuits are formed on various substrates, unnecessary resist patterns are removed after image formation. Generally, unnecessary resist patterns are removed using an asher (ashing device) or a solvent (releasing solution). When the asher is used, the operation may be time-consuming, and impurity ions in the resist pattern could remain on the surfaces of wafers. Use of the solvent poses the problem of impairing work environment.

A method of removing unnecessary resist patterns with adhesive tape has been proposed recently as disclosed in U.S. Pat. No. 5,759,336, for example. With this method, the adhesive tape is applied to a surface of a resist pattern on a wafer surface, and this adhesive tape is separated along with the resist pattern from the wafer surface.

The proposed method of removing resist patterns with adhesive tape avoids the inconveniences encountered in the conventional practice of resist pattern removal using an asher or a solvent. However, the proposed method has the following drawback. A resist pattern on an article such as a semiconductor substrate is extremely small and has only a small area of contact with an adhesive on the adhesive tape applied. On the other hand, the resist pattern adheres to the article with great bonding strength. The resist pattern may remain on the article without being separated therefrom as sticking to the adhesive tape. It is thus difficult to remove the resist pattern from the article completely.

SUMMARY OF THE INVENTION

This invention has been made having regard to the state of the art noted above, and its object is to provide a resist removing method for reliably removing resist patterns from articles such as semiconductor substrates by using adhesive tape.

The above object is fulfilled, according to this invention, by a resist removing method for removing a resist pattern from a surface of an article by applying an adhesive tape to the surface of the article covered with the resist pattern, and separating the adhesive tape from the surface of the article, the method comprising an adhesive tape applying step for applying the adhesive tape to the article covered with the resist pattern, a rapid cooling step for rapidly cooling the article with the adhesive tape applied thereto, and an adhesive tape separating step for separating the adhesive tape from the article.

According to this invention, an adhesive tape is applied to the surface of the article, and thereafter the article with the adhesive tape applied thereto is rapidly cooled. As a result, the resist pattern on the article contracts and becomes cracked, thereby weakening its adhesion to the surface of the article. Subsequently, the adhesive tape is separated from the article. The unwanted resist pattern less tightly adhering to the article surface may be removed therefrom together with the adhesive tape. Moreover, since cracks are formed in the resist pattern adhering to the adhesive tape, there is no possibility of diffusion or scattering to the ambient of the resist pattern separating from the surface of the article due to formation of the cracks.

Preferably, the rapid cooling step is executed to rapidly cool the article with a temperature difference of at least 150° C. This step will promote formation of cracks in the resist pattern due to its contraction, and separation of the resist pattern from the surface of the article.

It is more desirable that the rapid cooling step is executed to rapidly cool the article with a temperature difference of 170 to 200° C. This step will further promote formation of cracks in the resist pattern due to its contraction, and separation of the resist pattern from the surface of the article.

It is preferred that the adhesive tape applying step includes a heating step for heating the article when the adhesive tape is applied to the article. With the adhesive tape applying step including the heating step, the article is heated when the adhesive tape is applied to the article, to strengthen the cohesion between the adhesive tape and the resist pattern on the surface of the article. The resist pattern may be removed, with increased reliability, from the surface of the article rapidly cooled afterward. Since the rapid cooling step is executed to cool the article heated at the heating step, formation of cracks in the resist pattern due to its contraction, and separation of the resist pattern from the surface of the article, will be further promoted.

In another aspect of this invention, there is provided a resist removing method for removing a resist pattern from a surface of an article by applying an ultraviolet curable adhesive tape to the surface of the article covered with the resist pattern, and separating the adhesive tape from the surface of the article after irradiating the adhesive tape with ultraviolet rays. This method comprises an adhesive tape applying step for applying the ultraviolet curable adhesive tape to the article covered with the resist pattern, an ultraviolet irradiating step for irradiating the adhesive tape applied to the article with ultraviolet rays, a rapid cooling step for rapidly cooling the article with the adhesive tape applied thereto, and an adhesive tape separating step for separating the adhesive tape from the article.

According to this invention, an ultraviolet curable adhesive tape is applied to the surface of the article, and thereafter the adhesive tape is irradiated with ultraviolet rays. As a result, the adhesive is cued to strengthen the cohesion between the adhesive tape and resist pattern. Subsequently, the article with the adhesive tape applied thereto is rapidly cooled. As a result, the resist pattern on the article contracts and becomes cracked, thereby weakening its adhesion to the surface of the article. Subsequently, the adhesive tape is separated from the article. The unwanted resist pattern adhering with increased strength to the adhesive on the adhesive tape and adhering with decreased strength to the article surface may be removed from the latter together with the adhesive tape.

Preferably, the rapid cooling step is executed to rapidly cool the article with a temperature difference of at least 150° C. This step will promote formation of cracks in the resist pattern due to its contraction, and separation of the resist pattern from the surface of the article.

It is more desirable that the rapid cooling step is executed to rapidly cool the article with a temperature difference of 170 to 200° C. This step will further promote formation of cracks in the resist pattern due to its contraction, and separation of the resist pattern from the surface of the article.

It is preferred that the adhesive tape applying step includes a heating step for heating the article when the adhesive tape is applied to the article. With the adhesive tape applying step including the heating step, the article is heated when the adhesive tape is applied to the article, to strengthen the cohesion between the resist pattern on the surface of the article and the adhesive on the adhesive tape. The resist pattern may be removed, with increased reliability, from the surface of the article rapidly cooled afterward. Since the rapid cooling step is executed to cool the article heated at the heating step, formation of cracks in the resist pattern due to its contraction, and separation of the resist pattern from the surface of the article, will be further promoted.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIGS. 1A, 1B and 1C are explanatory views showing an operation based on a method in a first embodiment of this invention;

FIGS. 4A, 4B and 4C are explanatory views showing an operation based on a method in a second embodiment of this invention.

DESCRIPTION OF THE PREFERRED EMBODIMENTS

Figure 2D:
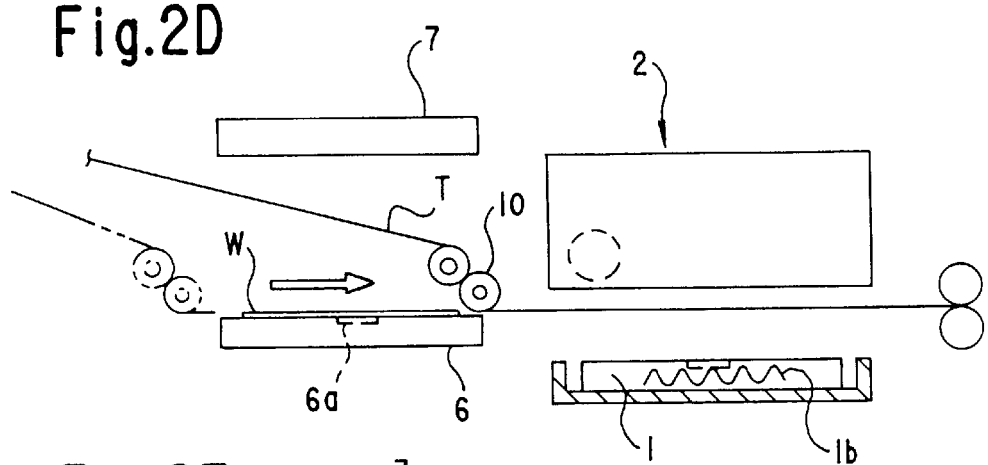
FIGS. 2D and 2E are explanatory views showing a subsequent operation in the first embodiment.

Preferred embodiments of this invention will be described in detail hereinafter with reference to the drawings.

<First Embodiment>

FIGS. 1 and 2 are explanatory views showing an operation based on a method in a first embodiment of this invention. This operation will be described hereinafter with reference to these drawings.

As shown in FIG. 1A, a semiconductor wafer W, which is one example of articles having a resist pattern formed thereon, is transported with a surface having the resist pattern facing upward to an applicator table 1 by a transport robot not shown. The wafer W is transferred to a suction pad 1a raised centrally of the applicator table 1. Subsequently, the suction pad 1a is lowered to place the wafer W on the applicator table 1. The applicator table 1 is disposed under an adhesive tape T in an extended state with the lower surface thereof acting as an adhesive surface.

As shown in FIG. 1B, the applicator table 1 is raised toward the lower surface of adhesive tape T, and an applicator mechanism 2 disposed above the adhesive tape T is lowered. The applicator table 1 and applicator mechanism 2 have hoods 3 and 4, respectively, which are joinable with and separable from each other. The hoods 3 and 4 joined are decompressed, and an applicator roller 5 is driven to roll along the upper surface of adhesive tape T in the decompression atmosphere. The adhesive tape T is thereby applied to the surface of semiconductor wafer W without trapping air between semiconductor wafer W and adhesive tape T. Meanwhile, the semiconductor wafer W is heated by a heater 1b mounted in the applicator table 1 to secure a cohesion between the adhesive on the adhesive tape T and the resist on the surface of wafer W. This completes a process of applying the adhesive tape T to the surface of semiconductor wafer W.

Next, as shown in FIG. 1C, the adhesive tape T with the semiconductor wafer W attached thereto is moved to a separator table 6. Then, the separator table 6 is raised, and a cooling panel 7 is lowered from a standby position over the separator table 6. The semiconductor wafer W and adhesive tape T sticking to each other are sandwiched between the separator table 6 and cooling panel 7.

Figure 3:
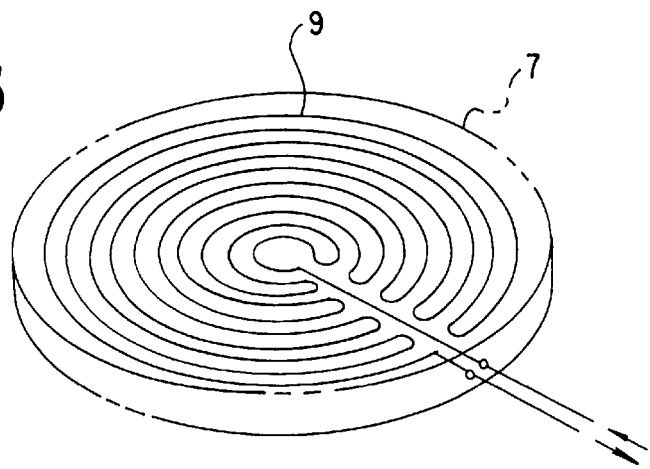
FIG. 3 is a perspective view of a cooling device.

The separator table 6 includes a cooler 8 employing thermoelectric cooling elements mounted therein. The cooling panel 7, as shown in FIG. 3, includes passages 9 formed therein for circulating liquid nitrogen or other cooling medium. Thus, the semiconductor wafer W is rapidly cooled at the upper and lower surfaces. By such rapid cooling, the resist pattern on semiconductor wafer W is contracted and cracked whereby its adhesion to the semiconductor wafer W becomes less tight.

Upon completion of the rapid cooling process, as shown in FIG. 2D, the cooling panel 7 is retracted upward, and separator rollers 10 are moved forward to separate the adhesive tape T from the surface of semiconductor wafer W. As a result, the resist pattern is removed from the semiconductor wafer W, as accompanying the adhesive tape T.

In the rapid cooling process, it is desirable to cool the semiconductor wafer W rapidly with a temperature difference of at least 150° C., preferably with a temperature difference of 170 to 200° C. A temperature difference less than 150° C. would result in an insufficient incidence of resist pattern cracking, thereby lowering the effect of peeling the resist pattern. The above rapid cooling should be carried out as quickly as possible, and the resist pattern may be peeled sufficient by cooling it for 2 to 3 seconds. In an experiment carried out, an unwanted resist was completed removed from the wafer surface by a rapid cooling to −20° C. on the separator table 6 after heating the semiconductor wafer W with the adhesive tape T applied thereto to 150° C. on the applicator table 1.

Figure 2E:
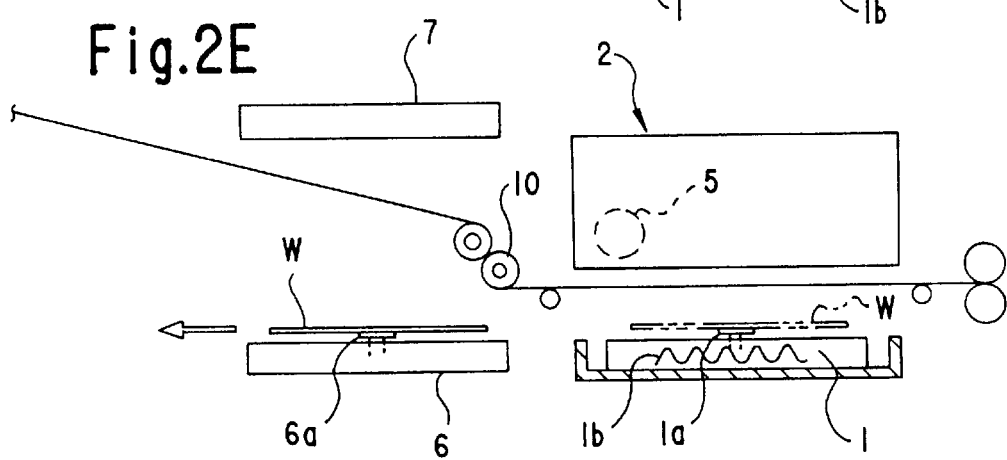

After the above adhesive tape separating process, as shown in FIG. 2E, the separator table 6 is lowered, and a suction pad 6a disposed centrally of the separator table 6 is raised to lift the semiconductor wafer W above the separator table 6. Then, the transport robot not shown unloads the processed semiconductor wafer W. Meanwhile, a new semiconductor wafer W is transported to the applicator table 1, and the above operation is repeated for the new wafer W.

<Second Embodiment>

FIGS. 4 and 5 are explanatory views showing an operation based on a method in a second embodiment of this invention. This operation will be described hereinafter with reference to these drawings.

As shown in FIG. 4A, a semiconductor wafer W is transported with a surface having a resist pattern facing upward to an applicator table 1 by a transport robot not shown. The wafer W is transferred to a suction pad 1a raised centrally of the applicator table 1. Subsequently, the suction pad 1a is lowered to place the wafer W on the applicator table 1. The applicator table 1 is disposed under an adhesive tape T in an extended state with the lower surface thereof acting as an adhesive surface. The adhesive tape T used in this embodiment is the ultraviolet curable adhesive type.

As shown in FIG. 4B, the applicator table 1 is raised toward the lower surface of adhesive tape T, and an applicator mechanism 2 disposed above the adhesive tape T is lowered. The applicator table 1 and applicator mechanism 2 have hoods 3 and 4, respectively, which are joinable with and separable from each other. The hoods 3 and 4 joined are decompressed, and an applicator roller 5 is driven to roll along the upper surface of adhesive tape T in the decompression atmosphere. The adhesive tape T is thereby applied to the surface of semiconductor wafer W without trapping air between semiconductor wafer W and adhesive tape T. Meanwhile, the semiconductor wafer W is heated by a heater 1b mounted in the applicator table 1 to secure a cohesion between the adhesive on the adhesive tape T and the resist on the surface of wafer W. This completes a process of applying the adhesive tape T to the surface of semiconductor wafer W.

Next, as shown in FIG. 4C, the adhesive tape T with the semiconductor wafer W attached thereto is moved to a separator table 6. Then, the separator table 6 is raise support the semiconductor wafer W thereon, and an ultraviolet irradiating unit 11 is lowered from a standby position over the separator table 6 to irradiate the adhesive tape T with ultraviolet rays. As a result, the adhesive of ultraviolet curable adhesive tape T is cured to strengthen its cohesion with the resist pattern. The ultraviolet irradiating unit 11 has a hood 12 for covering a region of irradiation to prevent leakage to the ambient of the ultraviolet rays emitted from an ultraviolet lamp 13.

Figure 5D:
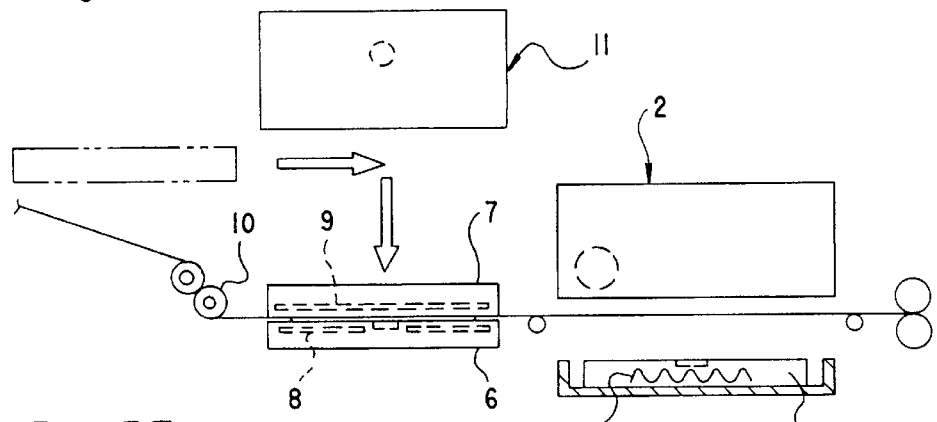
FIGS. 5D, 5E and 5F are explanatory views showing a subsequent operation in the second embodiment.

Upon completion of the ultraviolet irradiating process, as shown in FIG. 5D, the ultraviolet irradiating unit 11 is retracted upward, and subsequently a cooling panel 7 is lowered from its different standby position. The semiconductor wafer W and adhesive tape T sticking to each other are sandwiched between the separator table 6 and cooling panel 7.

As in the preceding embodiment, the separator table 6 includes a cooler 8 employing thermoelectric cooling elements mounted therein, and the cooling panel 7 includes passages 9 formed therein for circulating liquid nitrogen or other cooling medium. Thus, the semiconductor wafer W is rapidly cooled at the upper and lower surfaces. By such rapid cooling, the resist pattern on the semiconductor wafer W is contracted and cracked whereby its adhesion to the semiconductor wafer W becomes less tight.

Figure 5E:
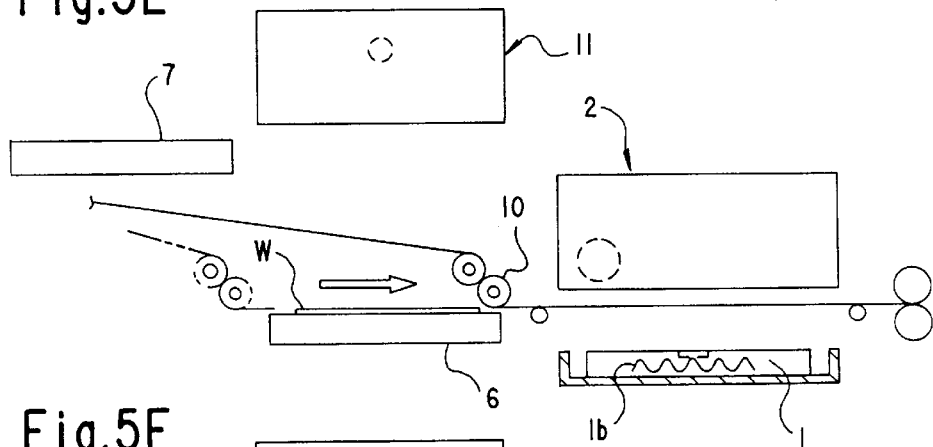

Upon completion of the rapid cooling process, as shown in FIG. 5E, the cooling panel 7 is retracted upward, and separator rollers 10 are moved forward to separate the adhesive tape T from the surface of semiconductor wafer W. As a result, the resist pattern is removed from the semiconductor wafer W, as accompanying the adhesive tape T.

Figure 5F:
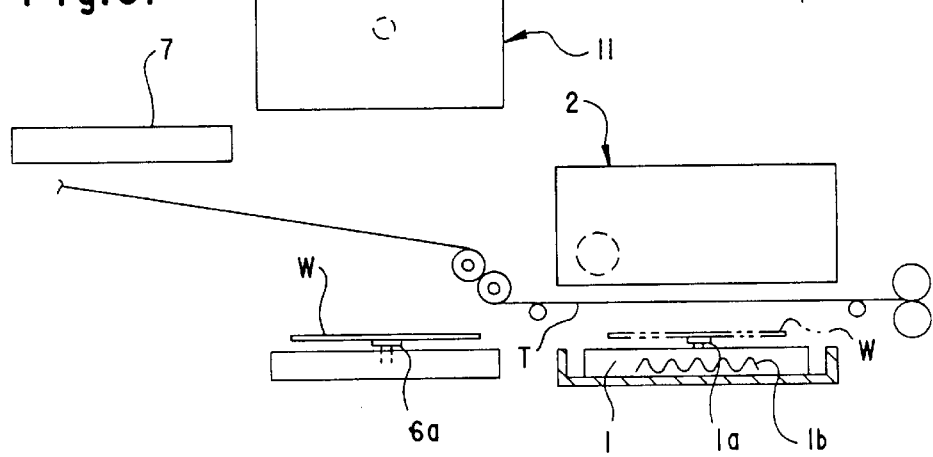

After the above adhesive tape separating process, as shown in FIG. 5F, the separator table 6 is lowered, and a suction pad 6a disposed centrally of the separator table 6 is raised to lift the semiconductor wafer W above the separator table 6. Then, the transport robot not shown unloads the processed semiconductor wafer W. Meanwhile, a new semiconductor wafer W is transported to the applicator table 1, and the above operation is repeated for the new wafer W.

This invention may be modified as follows.

The device for rapidly cooling the semiconductor wafer W with the adhesive tape T attached thereto is not limited to what is described in the foregoing embodiments. The rapid cooling process may be carried out through contact with only the separator table or only the cooling panel. Instead of cooling through direct contact, the articles may be rapidly cooled in an atmosphere cooled by liquid nitrogen or liquefied carbon dioxide (dry ice). It will serve the purpose only if the semiconductor wafer with the adhesive tape T attached thereto is cooled quickly with a large temperature difference.

The present invention may be embodied in other specific forms without departing from the spirit or essential attributes thereof and, accordingly, reference should be made to the appended claims, rather than to the foregoing specification, as indicating the scope of the invention.

What is claimed is:

1. A resist removing method for removing a resist pattern from a surface of an article by applying an adhesive tape to the surface of the article covered with the resist pattern, and separating the adhesive tape from the surface of the article, said method comprising:

an adhesive tape applying step for applying said adhesive tape to said article covered with said resist pattern;

a rapid cooling step for rapidly cooling said article with said adhesive tape applied thereto; and an adhesive tape separating step for separating said adhesive tape from said article.

2. A resist removing method as defined in claim 1, wherein said rapid cooling step is executed to rapidly cool said article with a temperature difference of at least 150° C.

3. A resist removing method as defined in claim 1, wherein said rapid cooling step is executed to rapidly cool said article with a temperature difference of 170 to 200° C.

4. A resist removing method as defined in claim 1, wherein said rapid cooling step is executed to rapidly cool said article with a temperature difference of at least 150° C. and within 3 seconds.

5. A resist removing method as defined in claim 1, wherein said rapid cooling step is executed to rapidly cool said article with a temperature difference of 170 to 200° C. and within 3 seconds.

6. A resist removing method as defined in claim 1, wherein said adhesive tape applying step includes a heating step for heating said article when said adhesive tape is applied to said article.

7. A resist removing method as defined in claim 6, wherein said rapid cooling step is executed to rapidly cool said article heated at said heating step, with a temperature difference of at least 150° C.

8. A resist removing method as defined in claim 6, wherein said rapid cooling step is executed to rapidly cool said article heated at said heating step, with a temperature difference of 170 to 200° C.

9. A resist removing method as defined in claim 6, wherein said rapid cooling step is executed to rapidly cool said article heated to approximately 150° C. at said heating step, to approximately −20° C.

10. A resist removing method as defined in claim 6, wherein said rapid cooling step is executed to rapidly cool said article heated to approximately 150° C. at said heating step, to approximately −20° C. within 3 seconds.

11. A resist removing method for removing a resist pattern from a surface of an article by applying an ultraviolet curable adhesive tape to the surface of the article covered with the resist pattern, and separating the adhesive tape from the surface of the article after irradiating the adhesive tape with ultraviolet rays, said method comprising:

an adhesive tape applying step for applying said ultraviolet curable adhesive tape to said article covered with said resist pattern;

an ultraviolet irradiating step for irradiating said adhesive tape applied to said article with ultraviolet rays;

a rapid cooling step for rapidly cooling said article with said adhesive tape applied thereto; and an adhesive tape separating step for separating said adhesive tape from said article.

12. A resist removing method as defined in claim 11, wherein said rapid cooling step is executed to rapidly cool said article with a temperature difference of at least 150° C.

13. A resist removing method as defined in claim 11, wherein said rapid cooling step is executed to rapidly cool said article with a temperature difference of 170 to 200° C.

14. A resist removing method as defined in claim 11, wherein said rapid cooling step is executed to rapidly cool said article with a temperature difference of at least 150° C. and within 3 seconds.

15. A resist removing method as defined in claim 11, wherein said rapid cooling step is executed to rapidly cool said article with a temperature difference of 170 to 200° C. and within 3 seconds.

16. A resist removing method as defined in claim 11, wherein said adhesive tape applying step includes a heating step for heating said article when said adhesive tape is applied to said article.

17. A resist removing method as defined in claim 16, wherein said rapid cooling step is executed to rapidly cool said article heated at said heating step, with a temperature difference of at least 150° C.

18. A resist removing method as defined in claim 16, wherein said rapid cooling step is executed to rapidly cool said article heated at said heating step, with a temperature difference of 170 to 200° C.

19. A resist removing method as defined in claim 16, wherein said rapid cooling step is executed to rapidly cool said article heated to approximately 150° C. at said heating step, to approximately −20° C.

20. A resist removing method as defined in claim 16, wherein said rapid cooling step is executed to rapidly cool said article heated to approximately 150° C. at said heating step, to approximately −20° C. within 3 seconds.

* * * * *